United States Patent [19]
Lhotak

[11] Patent Number: 5,860,365
[45] Date of Patent: Jan. 19, 1999

[54] TENSIONING DEVICE FOR FLEXIBLE DRIVE MEMBER

[75] Inventor: Roger W. Lhotak, Hanover Park, Ill.

[73] Assignee: The Chamberlain Group, Inc., Elmhurst, Ill.

[21] Appl. No.: 818,364

[22] Filed: Mar. 17, 1997

[51] Int. Cl.$^6$ ..................................................... B61B 9/00
[52] U.S. Cl. ........................ 104/172.5; 267/71; 49/199; 160/189
[58] Field of Search ................................ 104/172.5, 117, 104/240; 474/101; 49/199; 160/189, 193; 267/71, 72, 177; 254/231

[56] References Cited

U.S. PATENT DOCUMENTS

| | | | |
|---|---|---|---|
| 916,081 | 3/1909 | Williams, Jr. et al. | 104/117 |
| 1,287,463 | 12/1918 | Schwitzer | 403/326 |
| 1,290,964 | 1/1919 | Fuller | 104/117 |
| 2,128,030 | 8/1938 | Koleno | 267/72 |
| 2,567,727 | 3/1951 | Quackenbush | 403/326 |
| 2,687,297 | 8/1954 | Miller | 160/193 |
| 3,109,213 | 11/1963 | O'Sullivan | 211/119.09 |
| 3,235,246 | 2/1966 | Cowan | 49/139 |
| 3,256,594 | 6/1966 | Howard et al. | 267/177 |
| 3,306,121 | 2/1967 | Jenkins | 74/242.15 |
| 3,343,858 | 9/1967 | Rice | 287/119 |
| 3,833,045 | 9/1974 | Sivin | 160/193 |
| 4,560,147 | 12/1985 | Bowdren | 254/231 |
| 4,739,584 | 4/1988 | Zellman | 49/199 |
| 4,772,251 | 9/1988 | Goppelt et al. | 474/101 |
| 5,297,782 | 3/1994 | Dombrowski et al. | 267/177 |
| 5,331,901 | 7/1994 | Avery | 104/172.1 |
| 5,361,706 | 11/1994 | Kunczynski | 104/173.1 |

FOREIGN PATENT DOCUMENTS

| | | |
|---|---|---|
| 0265727 A1 | 5/1988 | European Pat. Off. . |
| 0317164 A1 | 5/1989 | European Pat. Off. . |
| 0343136 A1 | 11/1989 | European Pat. Off. . |

*Primary Examiner*—S. Joseph Morano
*Attorney, Agent, or Firm*—Fitch, Even, Tabin & Flannery

[57] ABSTRACT

A tensioning device is connected to a flexible drive member by a right-hand threaded member on the drive member, which projects through an opening in the wall of a trolley. The threaded member is threaded onto a tensioning nut which is biased by a spring which mounts the nut in the base of the tensioning device. A retainer nut having left-hand threads is in frictional engagement with an enlarged portion of the tensioning nut, such that turning of the retention nut tightens the tensioning device onto the threaded member until the frictional force of the engagement between the enlarged portion of the tensioning nut and retainer nut is reduced to a predetermined amount.

12 Claims, 4 Drawing Sheets

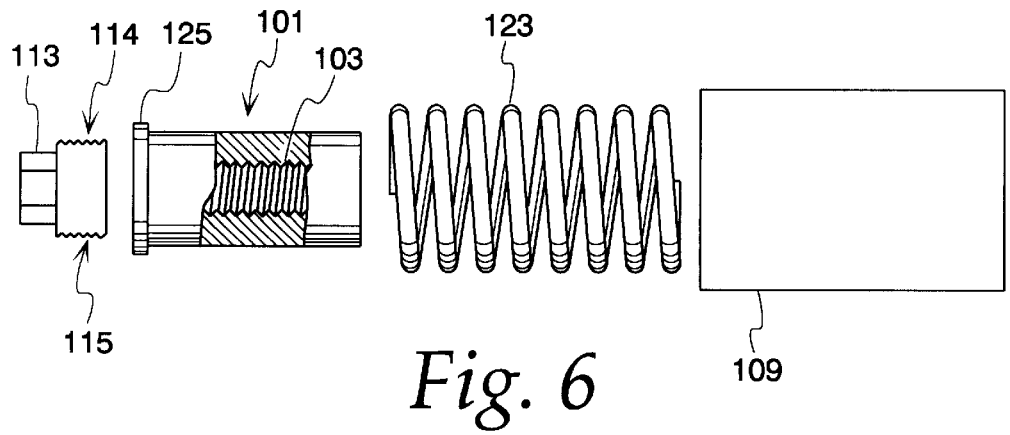
Fig. 6
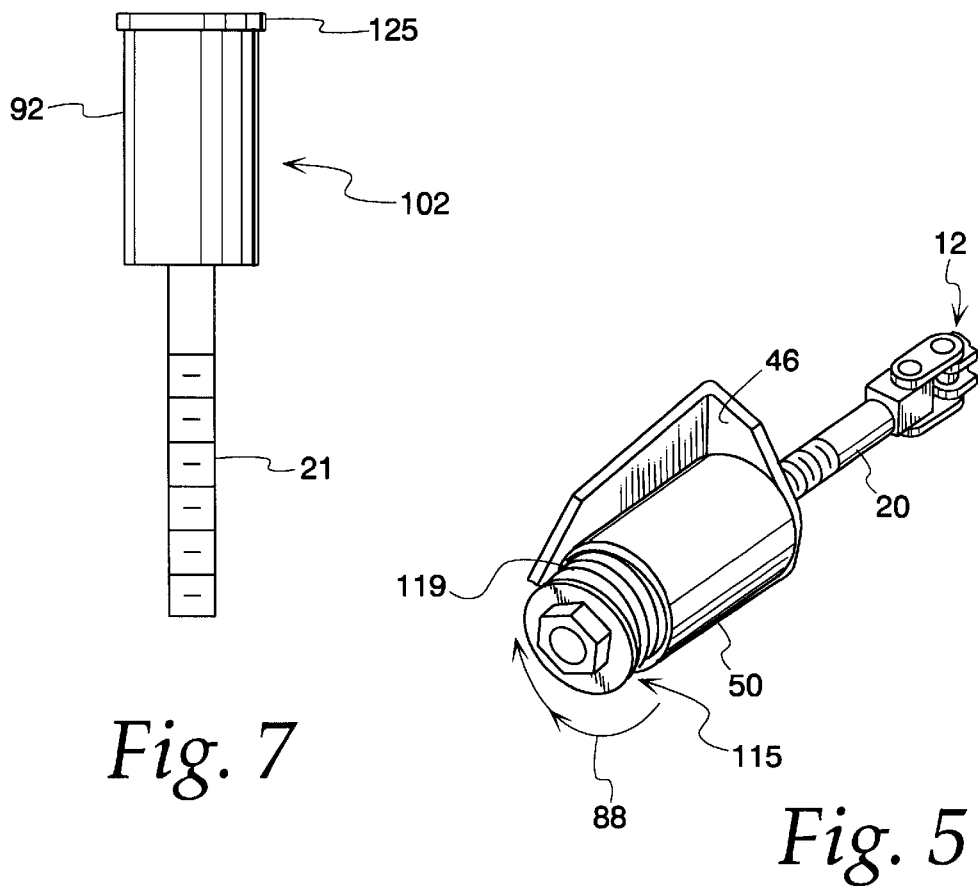
Fig. 7
Fig. 5

TENSIONING DEVICE FOR FLEXIBLE DRIVE MEMBER

BACKGROUND OF THE INVENTION

The present invention relates to a tension controlling device for the connection of members held in tension.

Many devices today employ a tension member to connect a flexible member to a relatively fixed member. One example is found in automatic garage door operators which use a flexible member such as a belt or chain to raise and lower the garage door. The flexible member is secured to a trolley which is linearly moved by an electrical motor to raise and lower the door. A tensioning device which includes a spring to maintain substantially constant tension in the flexible member and to counter the shocks of starting and stopping the door movement is used to connect the flexible member and the trolley.

One such device is described in U.S. Pat. No. 5,297,782 to Dombrowski et al. and includes a threaded shaft connecting a flexible member through an aperture in a trolley. A snubber unit is screwed onto the threaded shaft until the tension in the flexible member is approximately correct as judged by an assembler. At this time, a split ring keeper is removed from the snubber unit, which releases a spring to push against the trolley, finally adjusting the tension.

The Dombrowski et al. arrangement has performed well, however, the final tensioning of the flexible member is the result of adjusting the tension without the added spring tension, then later adjusting the tension with the added spring tension. Further, the removal of the split ring has been found difficult, particularly by home assemblers of a garage door system. Lastly, the final tension of the flexible member, which is important to the operation of the system, is left to the eye of the assembler which may vary from case to case.

A need exists for an improved apparatus for connection and tension adjustment between a first member and a flexible member which is easy to install and which controls the tension of the connection.

SUMMARY OF THE INVENTION

The need is met by tensioning apparatus in accordance with the present invention in which a threaded member is attached between the flexible member on one side of a wall and the tensioning apparatus on the other side. The tensioning apparatus includes right-handed mating threads so that clockwise rotation about an axis of the tensioning apparatus increases tension in the flexible member. The tensioning apparatus is rotated by a retaining member which is left-hand threaded to the tensioning apparatus about the axis of rotation. The retaining member is frictionally engaged with the tensioning apparatus by a spring which is compressed by tension in the flexible member. As tension in the flexible member increases, the amount of frictional engagement force decreases and the tensioning apparatus is rotated clockwise by means of the retaining means. When the tension in the flexible member becomes a predetermined amount, the frictional forces holding the retainer fixed to the tensioning apparatus are too small to hold the retaining means which breaks loose and rotates free and may be removed from the tensioning apparatus by continued clockwise rotation. It should be mentioned that the left-handed and right-handed threads can be switched so that the retaining member is connected by right-hand threads and the tensioning apparatus is connected to the flexible member by left-hand threads. What is needed is that the retaining member is connected to the tensioning apparatus by threads of one sense while the tensioning apparatus increases tension in the flexible member by means of threads of the opposite sense.

Tensioning apparatus in accordance with an embodiment of the invention comprises a base member disposed against one side of a wall which may be a part of a door or other barrier movement trolley. A retaining member is connected to the base by threads of a first sense, e.g., left-handed and a threaded member having threads of a second sense opposite to the first sense extends through the wall and connects the flexible member to the tensioning apparatus so that rotation of the tensioning apparatus in a first direction increases tension in the flexible member. A spring is disposed between the base and an enlarged adjunct of the threaded member to force the enlarged adjunct into frictional engagement with the retaining member. The above is constructed so that when the retaining member is rotated in the first direction, tension will increase in the flexible member and the frictional force between the enlarged portion and the retaining member will decrease. When the frictional force diminishes to a predetermined amount, the retaining member will "break loose" and rotate freely from the tensioning apparatus. By properly selecting the components of the tensioning apparatus, the final tension in the flexible member can be accurately predetermined.

In accordance with one embodiment of the invention, the threaded member is fixed to the flexible member and connects to a threaded tension adjusting unit having a threaded bore and the enlarged shoulder.

In accordance with another embodiment, the threaded member and enlarged portion may be an integrated unit which attaches to a threaded bore attached to the flexible member. The retaining member may be in the shape of a threaded cylindrical plug which screws into side walls attached to the base of the tensioning apparatus or it may be a threaded cap which screws onto threads around the side wall of the tensioning apparatus.

BRIEF DESCRIPTION OF THE DRAWINGS

FIGS. 3, 4 and 5 are fragmentary perspective views showing installation of the tensioning apparatus;

FIG. 6 is an exploded view of the tensioning apparatus of FIG. 2;

FIG. 7 shows an alternative embodiment of the connection between the tensioning apparatus and flexible member.

DETAILED DESCRIPTION OF PREFERRED EMBODIMENTS

Figure 1:
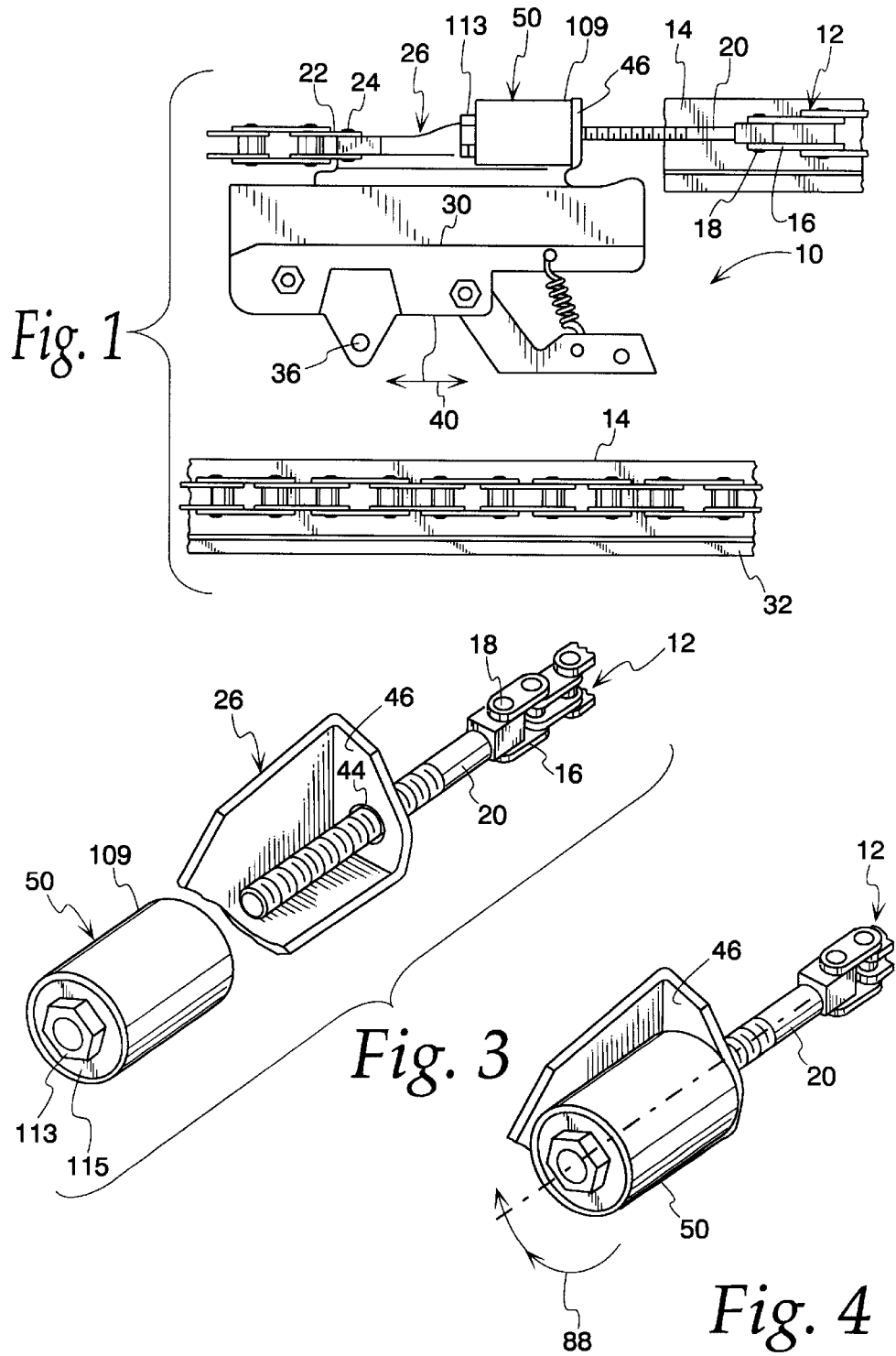
FIG. 1 is a fragmentary elevational view of a trolley drive system for a garage door operator.

The present invention is described herein as apparatus for connecting a flexible member, e.g. chain 12, to a trolley 26 of a garage door or other barrier opener. The garage door opener assembly is generally indicated at 10 in FIG. 1. A double-ended drive chain 12 is wrapped around a support rail 14 which extends between the drive motor of the garage door opener system (not shown) and the wall to which the garage door is mounted. The chain 12 has a first end 16 which is pinned at 18 to a threaded shaft 20. Chain 12 also includes a second end 22, pinned at 24 to trolley 26. The trolley 26 is of a conventional design, and includes a guide 30 which rides on a flange 32 of support rail 14. The support rail 14 is of a generally inverted T-shaped cross section. Trolley 26 further includes a mounting eye 36 for connection to a garage door, to move the garage door back and forth in a direction of double-headed arrow 40.

The drive chain 12 is wrapped about a gear sprocket located to the left of FIG. 1. The gear sprocket is driven in opposite directions, so as to move trolley 26 in the direction of double-headed arrow 40. During opening of the garage door, the trolley of FIG. 1 moves to the left and the direction of movement is reversed for a door closing operation. Thus, during a door closing operation, when the trolley is moved to the right-hand direction in FIG. 1, tension at the end 16 of the drive chain is relaxed and end 16 may even be placed in a slight compression, during some operating conditions of the garage door and garage door opener system. The free end of the threaded shaft 20 is inserted through an opening 44 (FIG. 3) in a mounting wall 46 of trolley 26 and is mounted to wall 46 with a tensioning apparatus 50 according to the present invention.

Figure 2:
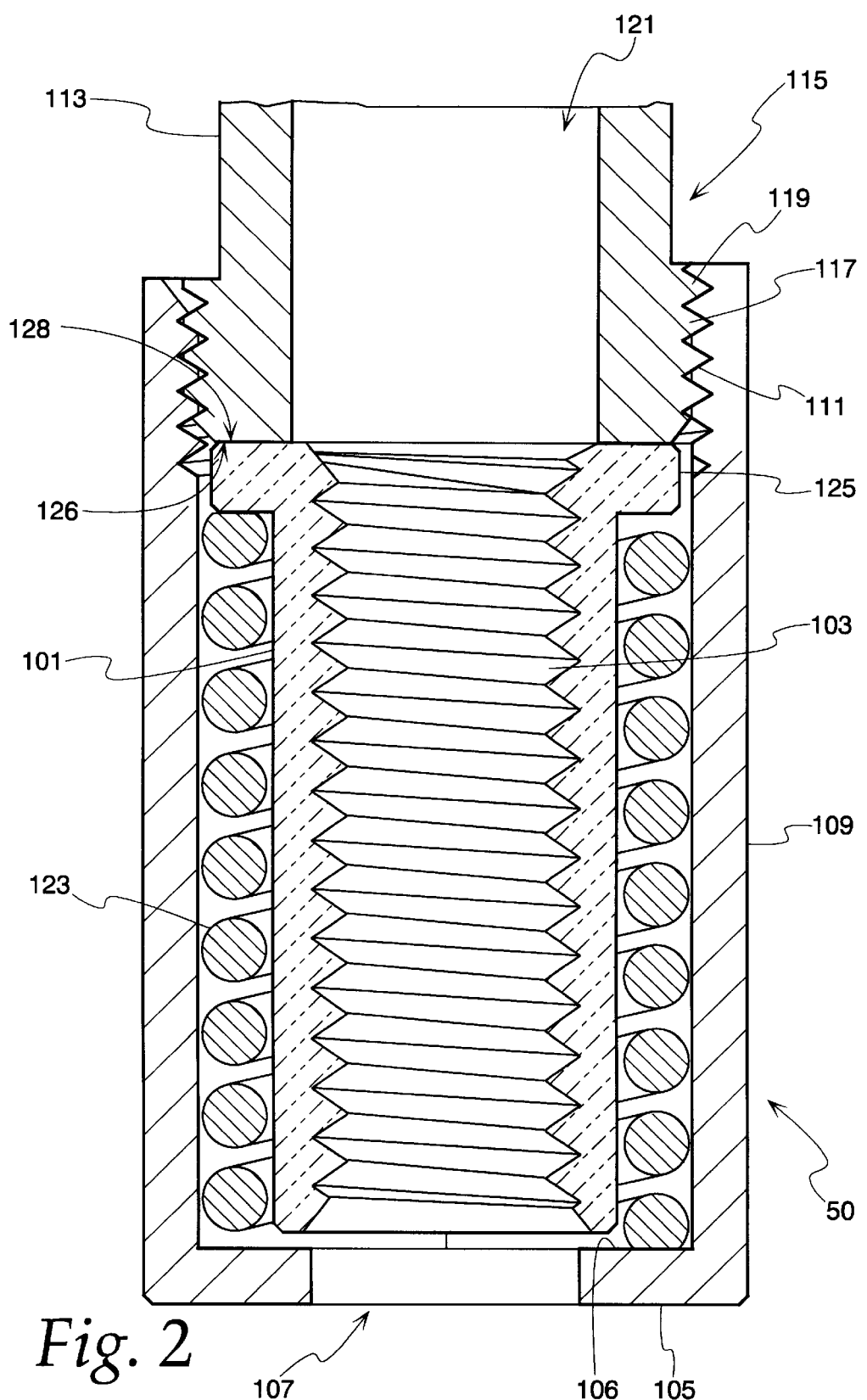
FIG. 2 is a cross-sectional view of a tensioning apparatus in accordance with the invention.

FIG. 2 shows a cross sectional view of tensioning apparatus 50 which includes a tensioning nut 101 having an internal right-hand thread 103 for attachment to the right-hand threaded member 20 of chain 12. Tensioning apparatus 50 includes a base 105 having an inner surface 106, an outer surface 104 and a central aperture 107 for freely passing the threaded member to the tensioning nut 101. In the present embodiment, the base 105 includes a cylindrical side wall 109. The top of side wall 109 includes internal left-hand threads 111 for the engagement of a retainer nut 115. Retainer nut 115 includes a cylindrical portion having left-hand threads 119 therearound for engagement with threads 111 of the side wall 109 and at the top a hexagonal portion 113 for standard wrench engagement. The retainer nut 115 also includes a central aperture 121 through which the threaded member 20 can freely pass. A spring 123 surrounds the tensioning nut 101 and is disposed against the inner surface 106 of base member 105. The tensioning nut 101 includes an enlarged portion or shoulder 125 against which the spring 123 contacts. As shown, the retaining nut 115, tension nut 101 are substantially coaxial when assembled. In FIG. 2, the spring 123 is compressed between shoulder 125 and base 105. The threaded bore 103, apertures 107 and 121 and the retaining nut 115 are all disposed to rotate about a common axis.

FIG. 6 is an exploded side view of the tensioning apparatus 50 and clearly shows that spring 123, in an uncompressed state, is longer than the cylindrical side walls of the tensioning nut 101. Tensioning apparatus 50 is assembled by inserting spring 123 into the cylinder 109, inserting the tensioning nut 101 into the center of the spring 123 compressing the spring and connecting the retainer nut 115 by means of the left-hand threads 119, 111. The side wall 109 is held from rotation and the retainer nut 115 is screwed into the side wall threads to compress spring 123. The amount of spring compression determines the static friction between the upper surface 126 of shoulder 125 and the lower surface 128 of retainer nut 115 and is controlled by the length of the spring 123, its spring constant and the depth to which nut 115 is screwed.

During assembly of the garage door opener system, the chain and support rail 14 are assembled and the threaded member is inserted through aperture 44 in wall 46 of the trolley 26. The tensioning apparatus 50 is then slid over the threaded shaft 20 until the shaft is engaged by right-hand threads 103 of tensioning nut 101 at which time tensioning apparatus 50 is rotated clockwise as shown at 88 (FIG. 4) to draw it onto threaded member 20. This may initially be done by manually rotating the side wall 109. When the base 105 contacts the wall 46, further tightening of tensioning apparatus 50 is performed using an appropriate wrench on nut 113.

It will be remembered that retainer nut 115 is left-hand threaded so that clockwise rotation of nut 113 will force it in a direction of rotation which would loosen the retainer nut 115 if the retainer nut were free to rotate. The friction between tensioning nut 101 and retainer nut 115, however, is initially strong enough to keep retainer nut 115 from rotating in its threads 111, 119. Instead, the entire assembly 50 is rotated onto threaded shaft 20. As threaded shaft 20 is drawn into tensioning nut 101 it exerts a downward (FIG. 2) force on nut 101 causing compression of spring 123 and a lessening of normal forces of friction between the shoulder 125 and retainer nut 115. At a predetermined amount of compression of spring 123, i.e., at a predetermined reduction of friction between tensioning nut 101 and retainer nut 115, the rotation of retainer nut 115 will overcome the frictional forces and the retainer nut will begin to rotate. Due to the left-hand thread of the retainer nut 115, it will be removed by continuing clockwise rotation. Careful design of the tensioning apparatus results in removal of the retainer nut 115 at a predetermined amount of tension in threaded member 20 and the claim 12.

During tightening, the static frictional force between the retainer nut 115 and the tensioning nut 101 must exceed the rotational forces between the wall 46 and base 105 and the frictional forces of the threaded shaft 20 and tensioning nut 101 until proper tension in the threaded member is achieved. In a system where:

$F_{sp}$=force of spring $F_b$=force in threaded member (flexible member)

$\mu_r$=coefficient of friction between tension nut and retainer nut $\mu_{tt}$=coefficient of friction between threaded member and tension nut $\mu_n$=coefficient of friction between retainer nut and casing $r_t$=effective radius of tension nut and retainer nut contact $r_{tt}$=effective radius of threaded member and tension nut threads $r_n$=effective radius of threads of retainer nut then the tension in the flexible member $F_b$ at breakaway of retainer nut can be calculated from:

$$(F_b)(\mu_{tt})(r_{tt})+(F_b)(\mu_t)(r_t)=(F_{sp}-F_b)\mu_n r_n$$

Figure 8:
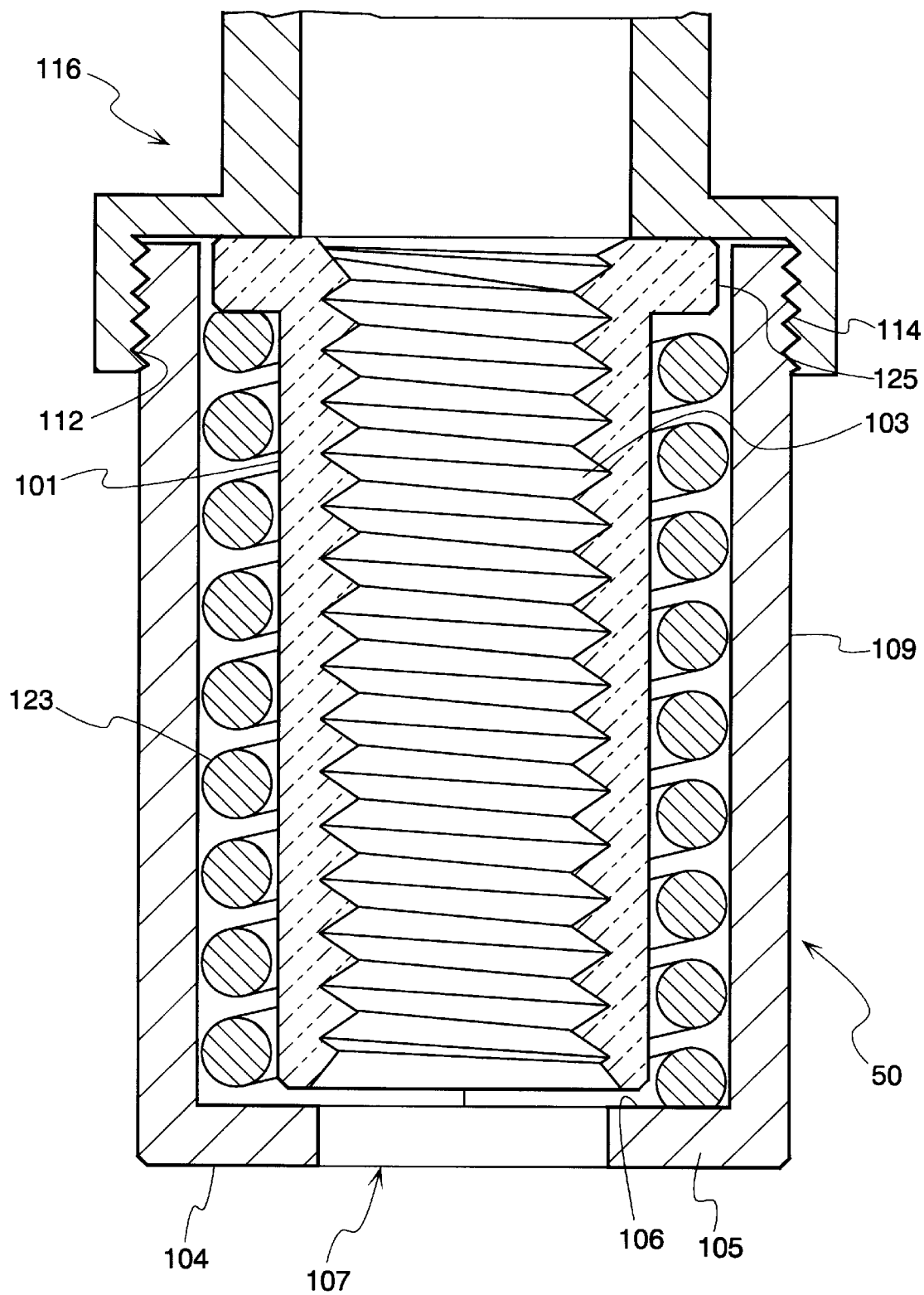
FIG. 8 is a cross-sectional view of an alternative embodiment of the tensioning apparatus.

In the preceding embodiment, the retainer nut 115 is in the form of a cylindrical plug which fills an open end of the cylindrical side walls 109 of the tensioning apparatus 50. In an alternative embodiment (FIG. 8), the retainer nut could be in the form of a cap 116 for the tensioning apparatus having left-hand internal threads 114 which mate with left-hand threads about the exterior of side wall 109. As in the preceding example, friction between tensioning nut 101 and retaining cap 116 will cause rotation of the entire apparatus 50 until the spring 123 compresses to diminish the friction to a predetermined point, at which the cap 116 rotates free from the apparatus.

Also, the preceding embodiments disclose a tension nut 101 having internal threads. An alternative embodiment is shown in FIG. 7 in which the exterior of a replacement tensioning unit 102 (FIG. 7) is substituted for the tension nut 101. The tensioning unit comprises a first portion 92 having a similar exterior shape to tension nut 101 and a threaded member 21 fixed, not threaded, thereto. Threaded member 21 has right-hand threads and extends through base 105 and wall 46 to mate with an internally right-hand threaded receiver (not shown) attached to the chain 12.

In the present description the retaining nut 115 is attached to the side wall/base by left-hand threads and the threaded member increases tension in the flexible member by right-handed threads. The sense of the two threaded connections can be exchanged and the result of operation will be the same as above described. That is, the retainer nut 115 could be right hand threaded and tension nut 101 could be left-hand threaded. The only difference in operation would be the counterclockwise rotation needed for increasing tension in the flexible member. As described herein, the retaining nut should be attached to the tensioning apparatus by threads of a first sense while the tensioning nut should increase tension in the threaded member by threads of a second sense opposite to the first sense.

What is claimed is:

1. Tensioning apparatus for connecting one end of a flexible first member to a second member having a wall with an aperture therethrough, the tensioning apparatus comprising:
   a base with an aperture therethrough, the base being disposed against one side of the wall and having an aperture aligned with the wall aperture;
   a retaining member connected to the base by a screw thread of a first sense;
   a threaded securing means having screw threads of a second sense opposite to the first sense including a shaft extending through the apertures of the base and wall for connecting the tensioning apparatus to the first member such that rotation of the tensioning apparatus in a first direction increases the tension between the second member and the flexible member;
   a spring disposed between the base and an enlarged portion of the threaded securing means for forcing the enlarged portion into frictional engagement with the retaining member such that rotation of the retaining member in the first direction imparts first direction rotation to the tensioning apparatus until the frictional engagement between the enlarged portion of the threaded securing means and the retaining member is reduced to a predetermined amount by increased tension in the threaded securing means.

2. A tensioning apparatus as claimed in claim 2 wherein the threaded securing means comprises a tension controlling nut having an enlarged portion for frictional engagement with the retaining member and central bore having internal threads of the second sense.

3. A tensioning apparatus as claimed in claim 2 wherein the threaded securing means comprises a threaded shaft having peripheral threads of the second sense engaged with the threaded bore of the tension controlling nut at a first end and fixed to the flexible member at a second end.

4. A tensioning apparatus as claimed in claim 1 wherein the base comprises a cylindrical side wall having a portion threaded in the first sense on an interior surface.

5. A tensioning apparatus as claimed in claim 4 wherein the retaining member is cylindrical and comprises a thread of the first sense about an exterior thereof for engagement with the threaded portion on the interior surface of the cylindrical side wall.

6. A tensioning apparatus as claimed in claim 1 wherein threads of the first sense are left-hand screw threads and threads of the second sense are right-hand screw threads.

7. Drive apparatus, comprising:
   a trolley having a wall defining an aperture for receiving a threaded shaft;
   a double-ended flexible drive member having a first end secured to said trolley and a second end with a threaded shaft extending through said trolley wall aperture;
   a base with an aperture therethrough, the base being disposed against one side of the wall and having an aperture aligned with the wall aperture;
   a retaining member connected to the base by a screw thread of a first sense;
   a threaded securing means having screw threads of a second sense opposite to the first sense including a shaft extending through the apertures of the base and wall for connecting the tensioning apparatus to the first member such that rotation of the tensioning apparatus in a first direction increases the tension between the second member and the flexible member;
   a spring disposed between the base and an enlarged portion of the threaded securing means for forcing the enlarged portion into frictional engagement with the retaining member such that rotation of the retaining member in the first direction imparts first direction rotation to the tensioning apparatus until the frictional engagement between the enlarged portion of the threaded securing means and the retaining member is reduced to a predetermined amount by increased tension in the threaded securing means.

8. A drive apparatus as claimed in claim 7, wherein the threaded securing means comprises a tension controlling nut having an enlarged portion for frictional engagement with the retaining member and central bore having internal threads of the second sense.

9. A drive apparatus as claimed in claim 8 wherein the threaded securing means comprises a threaded shaft having peripheral threads of the second sense engaged with the threaded bore of the tension controlling nut at a first end and fixed to the flexible member at a second end.

10. A drive apparatus as claimed in claim 7 wherein the base comprises a cylindrical side wall having a portion threaded in the first sense on an interior surface.

11. A drive apparatus as claimed in claim 10 wherein the retaining member is cylindrical and comprises a thread of the first sense about an exterior thereof for engagement with the threaded portion on the interior surface of the cylindrical side wall.

12. A drive apparatus as claimed in claim 7 wherein threads of the first sense are left-hand screw threads and threads of the second sense are right-hand screw threads.

* * * * *